Patented Jan. 19, 1943

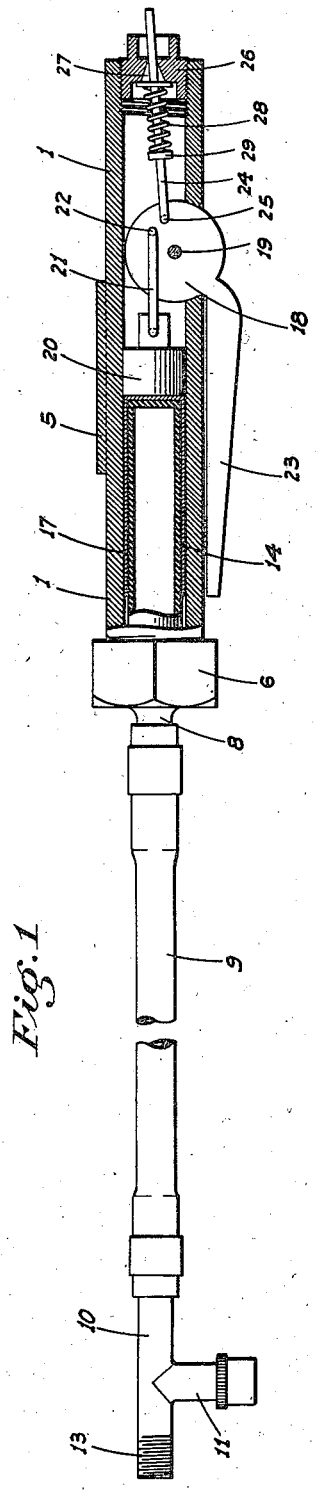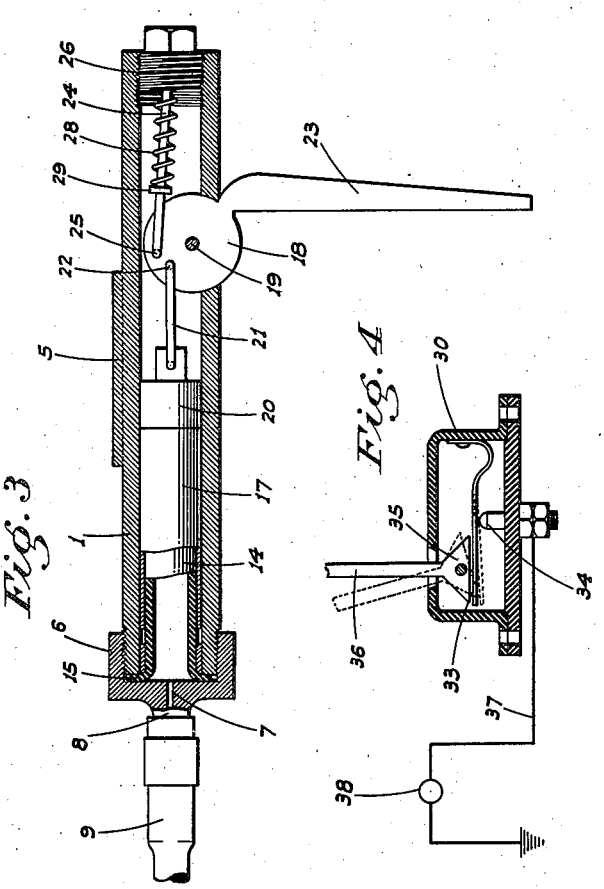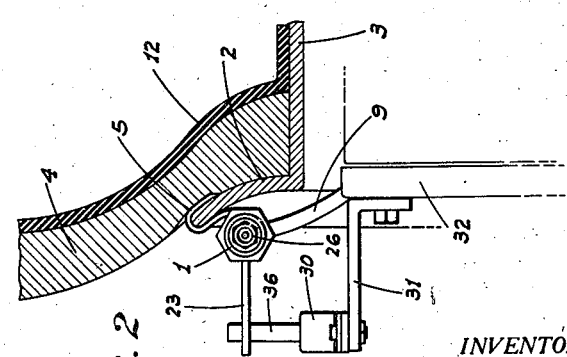

2,309,025

UNITED STATES PATENT OFFICE 2,309,025

TIRE PRESSURE INDICATOR

Clarence O. Thorson, Los Altos, Calif., assignor to J. L. Rich, Los Altos, Calif.

Application March 18, 1941, Serial No. 383,967

1 Claim. (Cl. 116—34)

This invention relates in general to a tire pressure indicating device, and in particular is directed to, and it is my principal object to provide, a tire pressure indicator which is operative to indicate low tire pressure to the driver while the vehicle is in operation; the device being especially suited for use in connection with dual wheels on trucks, trailers and the like, and where a low pressure in one tire is not so quickly "telegraphed" to the driver by sound or vibration as with a single wheel and tire.

Another object of the invention is to provide a tire pressure indicator which resets itself automatically after being actuated and upon pressure in the tire being raised to normal.

A further object of the invention is to provide, in a tire pressure indicator of the type which functions while the vehicle is in motion, an adjustable mechanism which can be set so that the indicator will actuate upon the tire pressure reducing to any predetermined amount.

A further object of he invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a longitudinal sectional elevation of the wheel mounted portion of the device, in normal, inactive position.

Figure 2 is a similar view of the wheel mounted portion of the device as actuated upon occurrence of a low tire pressure.

Figure 3 is an end view of the wheel mounted portion of the device as actuated, together with the switch unit as mounted on a non-rotatable part of the vehicle.

Figure 4 is a sectional elevation of the switch unit, and a diagram of the circuit.

Referring now more particularly to the characters of reference on the drawing, the wheel mounted portion of the device comprises a tubular body 1 adapted to be mounted alongside and extending circumferentially of the inner flange 2 of a wheel rim 3 on which the tire 4 is mounted; the body 1 including an attaching clip 5 which extends or hooks over flange 2 and engages between the latter and the tire adjacent its bead.

A cap or head 6 is threaded on one end of the tubular body 1; such head having an axial passage therethrough leading into a neck 8 which connects with one end of a flexible tube 9. The other end of tube 9 connects with a fitting 10 preferably of T type; one leg 11 being formed to attach to the conventional valve stem (not shown) of the tire tube 12, while the other leg of the fitting has a valve threaded therein and serves as the filler stem. It will thus be seen that the air pressure of the tire is present in tube 9 and passage 7.

A flexible extensible sack 14 is disposed in body 1 adjacent head 6; said sack being closed at its inner end, and at its outer end being formed with an annular retaining flange 15 clamped between head 6 and the end of the body. A thin metallic sleeve or sheath 17, closed at the same end as the sack, is engaged over the sack from its inner end and slidably engages within the tubular body 1; said sleeve sliding away from head 6 with normal tire pressure and corresponding pressure in and extension of the sack; the sack normally being extended and the sleeve disposed with its open end some distance from head 6, as shown in Fig. 1.

The sack and sleeve assembly occupy approximately one-half the length of the body, and a disc 18 is mounted in the body on a transverse shaft 19 and a portion of the disc circumference projects through a longitudinal slot in said body. A piston 20 slidable in body 1 is seated against the adjacent end of the sack enclosing sleeve 17, and a pivoted connecting rod 21 connects between the piston 20 and a pivot or crank pin 22 on disc 18 eccentric to the axis thereof. Pin 22 is normally disposed at a point beyond shaft 19 in a direction opposite piston 20. An arm 23 projects from disc 18 outside the body and normally extends lengthwise and in engagement therewith as shown in Fig. 1; said arm being movable upon rotation of the disc to a position projecting laterally from the body 1 and flange 2, and parallel to the axis of rotation of the wheel.

Another rod 24 is disposed in the body and is pivoted at its inner end on a crank pin 25 on disc 18 and extends therefrom in a direction opposite connecting rod 21; crank pins 22 and 25 being spaced somewhat, and both being mounted on the same side of dead center relative to the disc axis and opposite arm 23. At its outer end rod 24 extends through an axially orificed plug 26 threaded in the adjacent end of the body.

The orifice 27 is cone shaped, as shown, to permit free action of the rod 24 when the disc rotates. A compression spring 28 surrounds rod 24 between a collar 29 on the rod and head 26, and such spring is normally under compression.

The stationary portion of the device comprises a switch box 30 supported laterally of the rim flange 2 and radially inward thereof, by means of a bracket 31 secured on a stationary and adjacent part such as the brake back plate 32. The switch box encloses a switch which includes a spring finger 33 normally clear of a contact element 34, the latter being insulated from the box. A triangular cam 35 is pivoted clear of but adjacent the free end portion of finger 33, on the side thereof opposite element 34 and said cam, when rotated, in either direction is operative to depress the finger and engage the latter with element 34. A rigid finger 36 projects from cam 35 through an opening in the switch box, said finger extending across the path of movement of arm 23 when the latter is in projecting position, and at right angles to said arm.

The normally open switch including spring finger 33 and element 34 is interposed in a circuit 37 which has a signal light 38 therein, said light being disposed in the vehicle in sight of the driver.

Operation

If the tire pressure drops to a predetermined amount, the pressure in sack 14 likewise drops and the sack contracts. As a result, the sleeve 17 and piston 20, under the influence of spring 28, slide in a direction to effect rotation of disc 18 and to swing arm 23 to its projecting position where it remains as long as the pressure is low.

With rotation of the wheel, arm 23 intermittently engages finger 36, closing the switch and causing light 38 to blink, thus warning the driver of the low tire pressure.

It will be noted that when the tire is repaired and the correct pressure reestablished therein, the pressure indicator resets itself to normal upon the accompanying extension of the sack.

If it is desired to adjust the device to act at a different pressure, the threaded plug 26 is turned one way or the other to increase or decrease the compression of spring 26.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a wheel mounted tire pressure indicator which includes a tubular body having a longitudinal slot therethrough intermediate its ends, a disc mounted for rotation in the body on a transverse axis, a portion of said disc projecting through the slot, an arm projecting from the disc exteriorly of the body and movable between a normal and a signal position upon rotation of the disc, and means within the body responsive to tire pressure and operative upon lowering of tire pressure below a predetermined amount to effect movement of said disc and arm to signal position; said means including a pair of connecting rods extending from the disc in opposite directions within the body, crank pins on adjacent ends of said rods, said crank pins being connected with the disc in spaced relation circumferentially of the latter and eccentric to the disc axis but on the same side of dead-center, a piston slidable in the body beyond the disc in one direction and to which piston one rod is pivotally connected, a normally loaded compression spring about the other rod intermediate its ends, there being a stop on said other rod for one end of the spring and a stop on the body for the other end of the spring, said stop on the body comprising an axially orificed end plug through which said other rod projects in guided relation, the orifice being cone-shaped with the apex outermost, whereby to permit of free action of said other rod when the disc rotates.

CLARENCE O. THORSON.